R. P. PALMER.
TRANSMISSION CONTROL FOR AUTOMOBILES.
APPLICATION FILED NOV. 13, 1914.
1,212,670.
Patented Jan. 16, 1917.
4 SHEETS—SHEET 1.
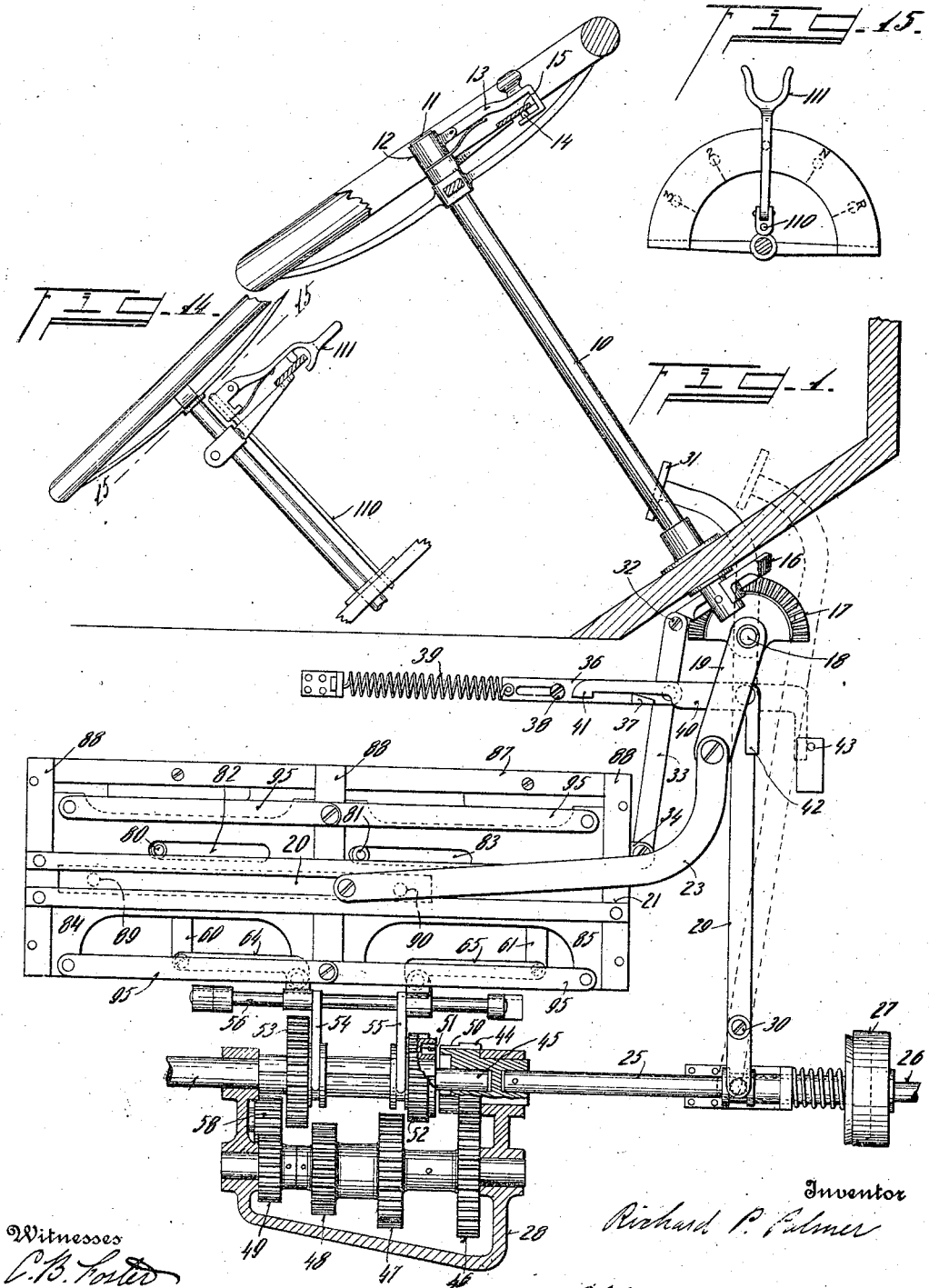
Witnesses
C. B. Foster
L. A. Beck
Inventor
Richard P. Palmer
By Word & Word
Attorneys

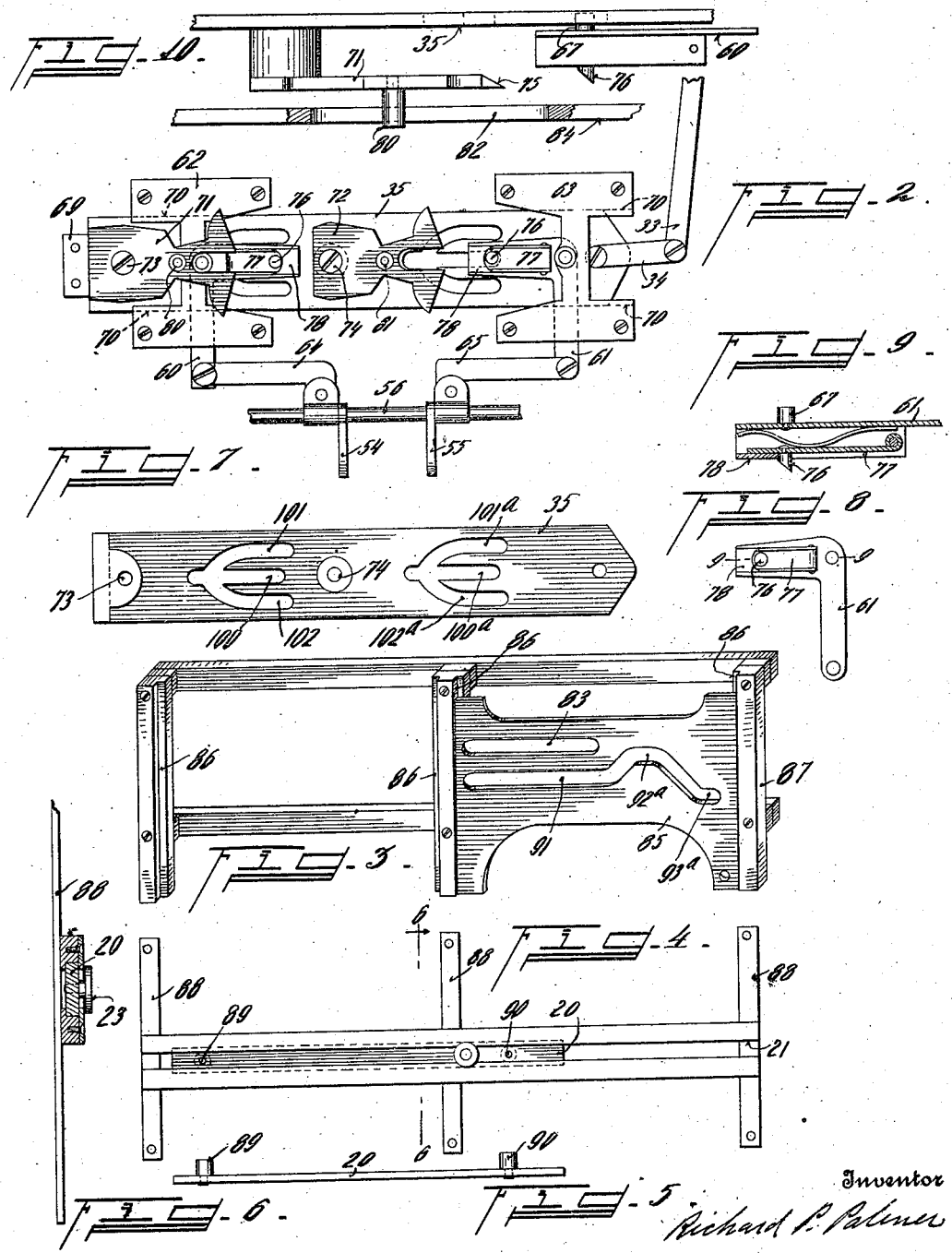

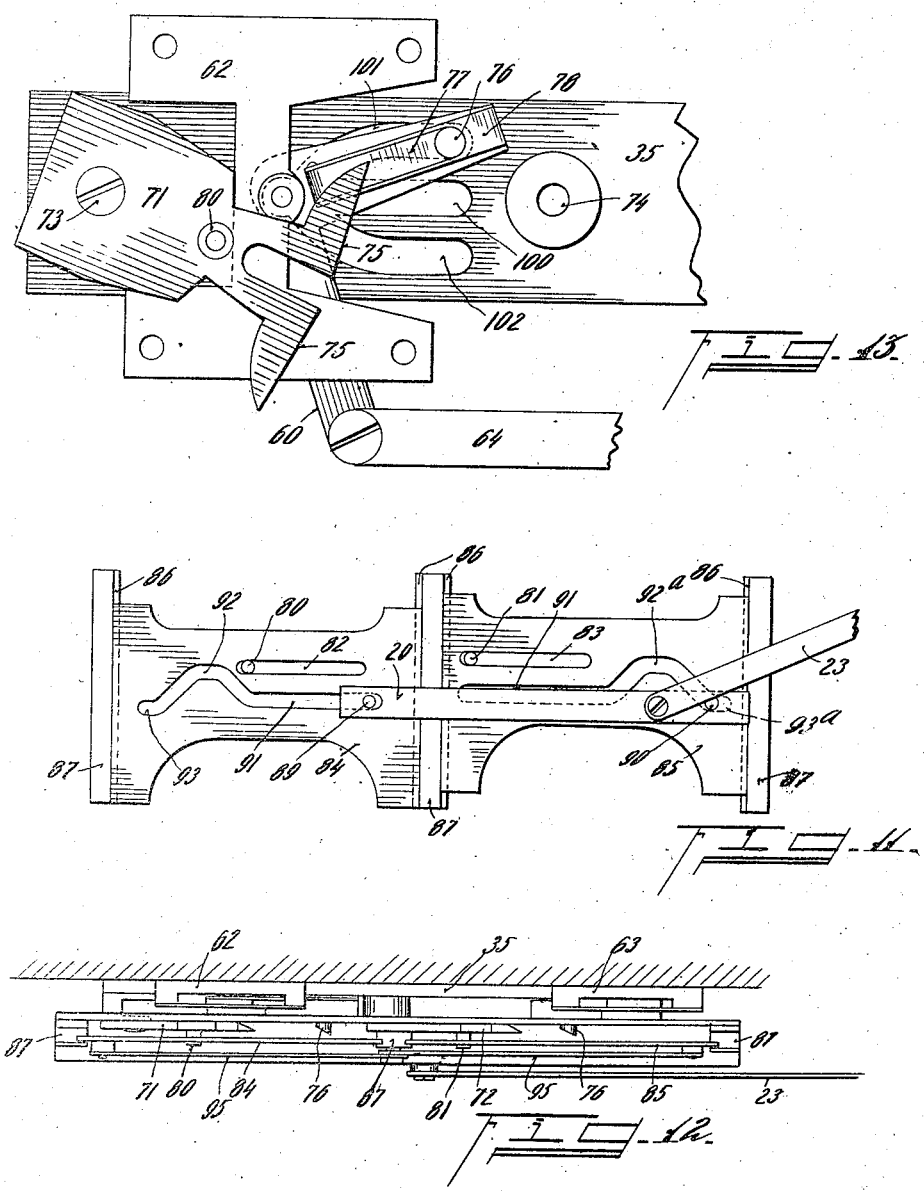

R. P. PALMER.
TRANSMISSION CONTROL FOR AUTOMOBILES.
APPLICATION FILED NOV. 13, 1914.

1,212,670.

Patented Jan. 16, 1917.
4 SHEETS—SHEET 4.

Witnesses
C. B. Foster
L. A. Beck

Inventor
Richard P. Palmer

By Wood & Wood
Attorneys

UNITED STATES PATENT OFFICE.

RICHARD P. PALMER, OF CINCINNATI, OHIO, ASSIGNOR OF ONE-HALF TO CHARLES R. PALMER, OF CINCINNATI, OHIO.

TRANSMISSION CONTROL FOR AUTOMOBILES.

1,212,670.   Specification of Letters Patent.   Patented Jan. 16, 1917.

Application filed November 13, 1914. Serial No. 871,999.

*To all whom it may concern:*

Be it known that I, RICHARD P. PALMER, a citizen of the United States, and residing at Cincinnati, in the county of Hamilton and State of Ohio, have invented a new and useful Improvement in Transmission Control for Automobiles, of which the following specification is a full disclosure.

My invention relates to control mechanism for speed change gearing and is primarily directed to its adaptation to automobile transmission gearing.

One of the objects of this invention is to provide a gearing control device, adjustable for a predetermined selective gear shift, and an operating means for shifting said gearing to their selected positions.

Another object is to provide a speed change gearing unit intermediate the driving and driven shafts, and a selective gearing control device adjustable to control the direction of a subsequent gear shift, and to provide an operating means adapted to first throw out the driving shaft clutch and then operate the gear shift mechanism.

Another object is to provide a gearing control device comprising a selective mechanism operated independently of the gear shifting members, but adapted to control the direction of a subsequent gear shift.

Another object is to provide two gear shifting members, each having two gear engaging positions and an intermediate neutral position, and control devices coördinately positioned to predetermine the direction of subsequent gear shift and to assure the automatic return to neutral intermediate position of one of the gear shifting members whenever either of the two gears engaging positions of its companion member have been selected.

Various other objects and features of the invention will be apparent from the accompanying drawings, and from the description thereof, and in such drawings like characters of reference denote corresponding parts throughout the several views, of which:—

Figure 16:
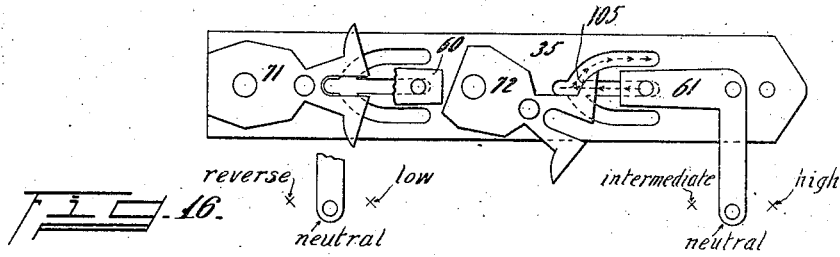
Figure 17:
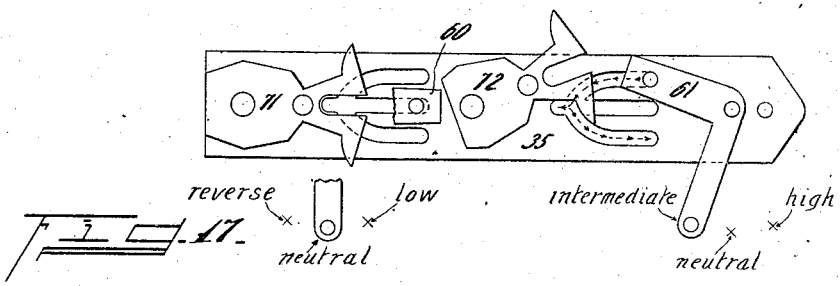
Figure 18:
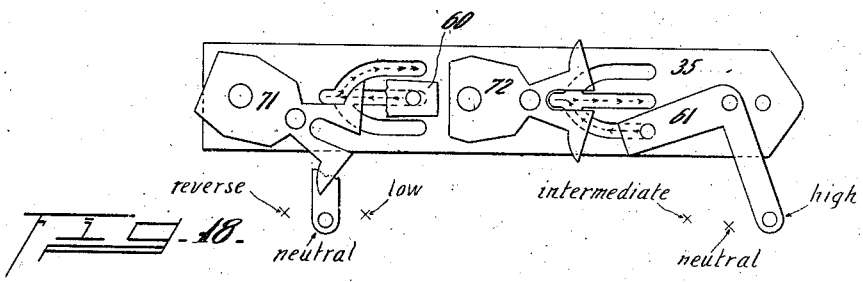
Figure 19:
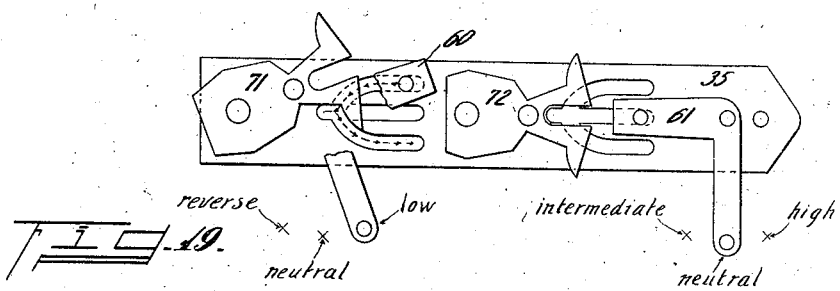

Figure 1 is a semi-diagrammatic elevation of my improved gear shift mechanism as applied to a conventional automobile structure. Fig. 2 is an elevation of the gear control mechanism with the selecting mechanism removed and with the parts shown in their neutral position. Fig. 3 is a perspective view of the frame supporting the selector plates, one of which is shown in position. Fig. 4 is a front elevation of the selector plate operating slide and its retaining slide-way. Fig. 5 is a top plan view of the selector operating slide. Fig. 6 is an enlarged section on line 6—6, Fig. 5. Fig. 7 is a detail view of the cam plate. Fig. 8 is a detail view of the cam selector. Fig. 9 is a section on line 9—9, Fig. 8. Fig. 10 is a top plan view of one of the switch plates and coacting elements. Fig. 11 is an elevation of the selector plates, showing the operating slide in operative connection therewith. Fig. 12 is a top plan view of the complete selective unit. Fig. 13 is an enlarged detail view of the cam selector 71 and its adjacent parts set for the "low" speed control. Fig. 14 shows a modified form of indexing mechanism. Fig. 15 is a plan view on line 15—15, Fig. 14. Fig. 16 is a diagrammatic view of the gear control mechanism, showing the positions of the parts as set for a change from "neutral" to "intermediate" speed. Fig. 17 is a similar view, showing the position of the parts as set for a change from "intermediate" to "high" speed. Fig. 18 shows the position of the parts as set for a change from "high" to "low" speeds. Fig. 19 shows the setting for a change from "low" to "reverse" drive.

Referring to Fig. 1, 10 indicates a tubular steering-post having journaled thereon a shaft 11, which has secured to its upper end a collar 12. Pivotally mounted on said collar is a hand lever 13, spring pressed upwardly to force a finger 14 thereof into engagement with retaining recesses in the index segment 15, which is secured to the steering-post. Secured to the lower end of the shaft 11 is a bevel gear sector 16 which meshes with a companion gear sector 17 journaled on a stud shaft 18, projecting from the frame-work of the machine. The gear sector 17 has a downwardly projecting arm 19 which is connected with a slide 20, by a link 23, said slide being guided in a slide-way 21, (see Fig. 4), and serving as an operating means for the selector plates, as will be later described.

The driving shaft 25 is operatively coupled with the engine shaft 26 by a clutch 27 and extends rearwardly to the speed change unit 28. Said clutch may be of any well known form, and, in this instance is shown as a spring actuated cone friction clutch disengaged by an operating lever 29, which is pivoted on the frame-work of the machine, at 30, and extends upwardly through a slot in the foot-board and terminates with a tread-plate 31. Pivoted at 32 is a depending link 33 which is pivotally connected to a connecting link 34 in turn pivotally connected to the reciprocatory multiple cam member or cam plate 35, (see Fig. 2) which serves as the main operating member of the selective mechanism, hereinafter described. A bar 36 is pivotally connected to the link 33 and is provided with an operating lug 37. Said bar is guided on a pin 38 and is spring drawn rearwardly by a spring 39. Pivoted on the operating lever 29 is an operating pawl 40, having a hooked end 41 adapted to engage the lug 37 of the bar 36 to cause said bar, through the links 33 and 34, to draw the cam plate 35 forwardly. This movement will continue until the depending end 42 of the pawl strikes a stationary pin 43, which will cause the hooked end 41 to disengage the lug 37, after which the spring 39 will restore the bar 36 and connected parts to normal position.

From the construction thus far described, it will be evident that the selective gear shift unit may be first set through the index lever 13, after which the operating lever 29 is rocked to first disconnect the clutch 27 and subsequently reciprocates the cam plate 35 to shift the gears of the speed change unit. In illustrating this speed change unit, I have utilized a well known form of sliding gears, coöperating with a gear cone on an intermediate shaft. The driving shaft 25 has secured to its rearward end a pinion 44, which is journaled in the gear case and supports the forward end of the driven shaft 45. Said pinion is permanently in mesh with the gear 46 of the constantly driven intermediate gear cone 45, 47, 48 and 49, and is provided with clutch teeth 50, which are adapted to be engaged by internal clutch teeth 51, formed in the recessed face of the sliding gear 52. The gear 52 and sliding gear 53 are splined on the driven shaft 45 and are positioned by yoke arms 54 and 55, slidably mounted on a stationary rod 56. A shifting to the right (as viewed in Fig. 1) of the gear 52 will intermesh the clutch teeth 50 and 51 and provide for a "direct" or "high" speed drive while a shifting to the left thereof will intermesh the gear 52, cone gear 47, and provide for an "intermediate" speed drive through gears 44, 46, 47 and 52. A shifting to the right of the gear 53 will intermesh said gear with the cone gear 48 and provide for a "low" speed drive through gears 44, 46, 48 and 53, while a shifting to the left thereof will intermesh gear 53, with an intermediate gear 58, which is in constant mesh with the cone gear 49, and provides for a "reverse" drive through gears 44, 46, 49, 58 and 53. These different drives may also be termed first, second, third and reverse.

The lateral selective shifting of the yoke arms 54 and 55 is accomplished by duplicate operating mechanisms, consisting of bell crank levers 60, 61, each pivotally mounted on stationary brackets 62, 63, (see Fig. 2), and connected to the yoke arms by links 64, 65. These levers 60, 61, may be termed gear control elements in that their movements control the lateral shifting of the gears 52, 53. Pin 67 projects rearwardly from the short arms of the bell crank levers and extends into "three-way" cam slots in a reciprocatory cam plate 35, said slots normally serving as a means for retaining the levers 60, 61, in their selected positions, and during the reciprocations of the cam plate as operating means for rocking the bell crank levers.

The cam plate 35 slides in grooves 70, in the brackets 62, 63, and as previously explained, is reciprocated by the operating lever 29, through the link connections 33, 34, and escapement mechanism 36, 40. As the cam plate is returned to normal position through the influence of the spring 39 of the escapement mechanism, I provide a stop plate 69, for limiting such return movement.

In Fig. 2, the bell crank levers and yoke arms are shown in neutral position for positioning the gears, as shown in Fig. 1.

For predetermining which branches of the cam slots are to become effective to engage the pins 67, during a subsequent reciprocation of the cam plate 35, I provide a pair of prepositioned cam selector switch plates 71, 72, which are pivotally mounted on the cam plate at 73, 74. These switch plates may also be termed "predetermining transmitters," and are selectively positioned by selector plates (as will be later described) to guide the pins 67, into the proper branches of the "three-way" slots of the cam plate and are provided with beveled edges 75, adapted to coöperate with beveled pins 76, (see Fig. 8), with a wipe pawl action during the positive stroke of the cam plate. Said beveled pins or spring plungers 76 are carried by a spring pressed pivotally mounted hinge member 77, confined within a housing on the bell crank levers 60, 61, and limited in their outward movements by the front plate 78, of said housing.

The switch plates 71, 72, are provided with forwardly projecting guide pins 80, 81, which reciprocate in elongated slots 82, 83, formed near the upper edge of a pair of selector plates 84, 85, relatively vertically positioned to selectively position the switch plates by determining the plane of travel of the guide pins 81, 82 thereof. These selector plates are guided in ways 86, formed in a frame-work 87, and are retained therein by retaining strips 88.

To overcome end thrust of the selector plates against the ways 86, I provide parallel movement links 95, which are pivotally mounted at one end on the middle retaining strip 88 and at their other ends pivotally connected to the selector plates.

The slide 20 (previously described) is provided with a pair of rearwardly projecting anti-friction rollers 89, 90, which engage in elongated cam slots, in the selector plates, having three elevations. By a lateral reciprocation of the slide 20, these selector plates are alternately raised and lowered to control the switch-plates 71, 72. The portion 91 of each selector plate may be termed the neutral zone, and it will be seen (Fig. 11), that when one of the rollers 89, 90, of the slide 20, engages with the effective portion of the cam slot of one selector plate, the companion roller will reciprocate in the neutral zone 91, of the cam slot of the other selector plate, thereby forming an interlock against a double gear shift. Referring to selector plate 84, the portion 92, of the cam slot, may be termed the "low" speed zone, and the portion 93, the "reverse drive" zone. With reference to selector plate 85, the portion 92$^a$ of its cam slot, may be termed the "intermediate" speed zone, and the portion 93$^a$ the "direct high" speed zone. These terms serve to differentiate the effects of the different selector plate settings.

With reference to Figs. 16 to 19, I will now describe the functions of the cam selector switch plates and the "three-way" slots in the cam plate. The "three-way" slots of the cam plate 35, consist of the neutral branches 100, 100$^a$, the "intermediate" speed branch 101$^a$, the "direct high" speed branch 102$^a$, the "low" speed branch 101, and the "reverse" drive branch 102.

In Fig. 16, the appropriate setting for a change from "neutral" to "intermediate" speed is shown, with the pins 66, 67, of the bell crank levers 60, 61, in the neutral branches 100, 100$^a$, of the "three-way" slots of the cam plate 35. The switch plate 72 has been lowered through the lowering of the selector plate 85, by the lateral setting of the selector plate operating slide 20, the roller 90 thereof engaging the "intermediate" speed zone 92$^a$ of the selector plate cam slot. It will be remembered that the lateral setting of the operating slide 20 is effected by the setting of the hand index lever 13 on the steering post. During the subsequent reciprocations of the cam plate 35, carrying the switch plates, the pin 67 will be guided in the path, indicated by dotted lines, and during the reciprocation to the right thereof, the upper beveled edge 75, of the switch plate 72, will engage the beveled spring plunger 76, of the bell crank lever 61, with a wipe pawl action, without effecting the elevation of said plunger, or the pin 67, which are axially alined. This will position the pin 67, in the left hand end of the neutral branch 100$^a$, of the "three-way" slot, said pin, during the return movement of the cam plate and switch plates being switched upwardly by an engagement of the edge 105, of the switch plate 72, with the spring plunger 76. The "intermediate" branch 101$^a$ of the "three-way" slot completing such upward movement of the pin 67, to rock the gear controlling bell crank lever 61 and retain it in its shifted position.

In Figs. 17, 18 and 19, the actions of the parts follow the same principle, as above described, and it is thought that the dotted line indications will make the different shifting movements clear without further elaboration.

In Figs. 14 and 15, the modified form of selector plate setting means shows the index rod 100 mounted parallel with and external of the steering post, and the outer end of the index lever 111, forked to receive the tip of a finger of the operator, enabling a setting thereof without removing the hand from the rim of the steering-wheel.

As illustrated in Fig. 1, the parts occupy a neutral position with the foot treadle clutch engaged. Such condition prevails after the hand lever 13 has been set to neutral and the clutch released to a degree for energizing and tripping the spring 39, in other words, a clutch releasing movement is necessary to make each change in the transmission. The index or gear selecting lever 13 and its controlling mechanism is not in its operation dependent upon any movement or control of the foot treadle clutch. The lever 13 is shifted to predeterminately or advancely adjust the selecting devices for a subsequent change of gear combination, which is only effective during an interval or degree of the treadle clutch releasing motion, whereupon the shifting of the gears or change of drive is automatically accomplished. The lever 13 governs in selecting of a gear combination or drive change and the actual change or gear shifting movements performed by other mechanism, and the latter operation accomplished under the most favorable conditions in the proper sequence, to meet any exigency arising for the necessary control of a motor vehicle. Thus as the index lever 13 is not dependent upon the control or motion of any other device in making a selection of a gear combination or drive desired or to be subsequently desired, the operator can make a selection at any convenient or opportune time, and quickly altered to meet any exigency. But for the purposes herein, presuming that the operator selects the "intermediate" drive or gear combination, moving the index lever 13 from any position it may occupy to the appropriately indexed position on the dial 14. Such motion will move the slide 20 the required degree to reciprocate the selector plates 84, 85, to their relative stations. And, assuming that the transmission gears occupy the neutral position, as in Fig. 1, when making such selection, plate 84 would remain stationary, by reason of the roller 89 upon the slide 20, traveling in the neutral portion 91 of the cam slot. The slide 20 moving toward the right causes the roller 90 to ride in the cam slot portion 92ᵃ moving selector plate 85 downward. The selector plate 84 and its controlling switch plate 71 are locked in their neutral position. Such downward motion of the selector plate 85 swings its switch plate 72 to the position, shown in Fig. 16, which shows the gear shifting levers in neutral position. The switch plate 72 is, therefore, thrown to track the lever 61 into slot 101ᵃ.

From the foregoing it will be apparent that the selector movements in no wise affect the position of the transmission gears or drive.

The actual shifting is accomplished indirectly by the clutch lever, and during a portion of its forward or clutch releasing motion. Thus assuming the clutch engaged, the first portion of the movement of the treadle lever is utilized to release the clutch, which insures that the transmission shaft is disengaged from the engine or driving shaft before any shifting of gears is accomplished. The next portion of the forward movement of the lever is utilized for energizing spring 39 and for moving the cam or shifter plate to its neutral station; the motion being continued until sufficient spring energy has been stored for shifting the gears, whereupon the clutch lever is automatically released from the spring. The release is accomplished by tripping the lever or pawl 40 from its engagement with the catch or lug 37. The recoil or compression of the spring swings the lever 33 and the cam or shifter plate 35, moving the cam or shifter plate in an opposite direction, and with the switch plate 72 located to track the shifting lever 61 into the slot 101ᵃ, swings the lever 61 toward the gears into their "intermediate" location, as shown in Fig. 17. The neutralizing direction of motion of the shifter plate 35, moving all the transmission elements to neutral, while the reverse motion thereof appropriately moves the transmission parts to their selected changed position. The switch plates have no diverting influence upon the shifting levers during the neutralizing motion of the shifter plate 35.

With the gears shifted by the pressure of the spring a material advantage is obtained, in that the moving gear or clutch yields to any impact caused by a non-meshing of the gears, until the gear teeth register, relieving any harsh meshing or clashing of the gears injurious to the teeth.

Should the operator, after completing a selected change find it necessary to make a second change, the same can be accomplished by properly positioning the selected lever and permitting the clutch treadle to move in a return direction or to the first region of its stroke, without reclutching driven shaft, and following the operation of lever motion above described. Thus a selection can be made, either with the clutch engaged or disengaged, but an actual gear change cannot be performed unless the clutch is disengaged.

Having described my invention, I claim:—

1. A variable ratio gearing comprising a plurality of gears, a clutch for the transmission control of said gears, actuating means for said clutch, shifting means for said gears, and actuating means for said shifting means adapted to be connected with and disconnected from said clutch actuating means during a part of the clutch releasing movement, thereby moving under tension with said clutch actuating means in one shifting motion and independently in an alternate shifting motion.

2. A variable ratio gearing comprising a plurality of gears, a clutch for the transmission control of said gears, actuating means for said clutch, shifting means for one of said gears movable to a plurality of shifting positions, selector means for determinately controlling said shifting means in its motion to each shifting position, and actuating means for said shifting means adapted to be connected with and disconnected from said clutch actuating means, for moving said actuating means in alternate directions during a part of a clutch releasing movement.

3. In a transmission-gear shifting-mechanism, the combination of a gear-shifting member, movable between neutral and active positions; a lever operable from a driver's station; means movable in one direction for coöperating with the shifter member to move it to neutral position and movable in another direction for selectively coöperating with said shifter member to move it to active position; means to impart such dual movements to the first mentioned means upon unidirectional movement of the lever; and means controllable from the driver's station for selectively conditioning the first-mentioned means to move the shifting member to active position.

4. In a structure of the character described, the combination with a clutch; a clutch lever movable one way to disengage the clutch and the other way to restore it; and selective transmission gearing; of a gear shifter movable between neutral and active positions; a part movable in two directions, respectively to, first, coöperate with the shifter member to move it to neutral position and, second, to coöperate, if set therefor, with the shifter member to move it to an active position; means for translating one-way, clutch-disengaging movement of the clutch lever into the stated two-way movement of said part; and means for setting said part at will for its second-stated coöperation with the gear shifter.

5. The combination with an automobile clutch and selective transmission gear, of a gear shifter comprising two shifter members respectively engaging movable elements of the transmission, said shifter members being axially movable in either direction from neutral mid-position, moving means for said shifter members selectively connectible therewith to move them in either direction from neutral, and invariably operable, preliminarily to connection, to position both shifters in neutral, a power lever associated with the clutch to control the same and connectible with the shifter means to control their preliminary movement, and automatic means to free said shifter moving means from the power lever and effect their further movement.

6. The combination with an automobile clutch and selective transmission gear, of a gear shifter comprising two shifter members respectively engaging movable elements of the transmission and each movable in two directions to active positions from neutral mid-positions, moving means for said members having two way movement respectively to restore said members to neutral and, if set therefor, to move either thereof in either direction from neutral position; preliminarily operable-means to set said moving means for movement of the desired shifter member to desired active position, a clutch controlling lever, and means for translating unidirectional, clutch-disabling movement of said clutch lever into the two-way movement of said moving means.

7. The combination, in a device of the character described, of a gear shifter member movable between neutral and active positions, means operable in one direction invariably to position said gear shifter in neutral position and operable in the other direction to move the gear shifter to active position; spring means for imparting the last said movement to said means and normally holding it in the position to which it is so moved; and a lever connected and arranged, in the course of unidirectional movement, to move said means in direction to position the shifter member in neutral and to release said means for spring actuation in the other direction.

8. The combination with a change speed transmission gearing and a clutch, of manually operable means for releasing said clutch, shifting mechanism for said change speed gearing, means for storing power by the operation of said manually-operable clutch releasing means, and a trip for releasing said stored power and actuating said shifting means thereby.

9. The combination with a change speed transmission gearing, of manually-operated means for storing power, means for instantaneously releasing said stored power, means for shifting said transmission gearing actuated by said released stored power, and selective means for determining the particular shift.

10. The combination with a change speed transmission gearing, of means for shifting said gearing to a plurality of positions, means operable in advance of the shifting operation for selecting the particular shift, a clutch-operating pedal, and means operated by said clutch-operating pedal while moving in one direction subsequent to the release of the clutch for storing power and then releasing the same, the released stored power actuating said shifting means.

11. The combination with a change speed transmission gearing, of a clutch-operating pedal, means operated by said pedal subsequent to the release of the clutch for shifting the gears to a neutral position, means operated by said pedal moving in one direction for storing power and releasing the same near the completion of the movement in said direction, means operable by the released power for shifting the gears to any one of their several positions of adjustment, and selective means for determining the particular shift affected by the released power.

12. The combination with shifting means, of a member movable in one direction to store power and instantaneously movable in the reverse direction by the instantaneous release of said stored power, said member being mechanically moved in both directions, and a plurality of coupling connections between said member and said shifting means alternatively operable to cause the movement of said shifting means to a selected position of adjustment.

13. The combination with gear shifting means, of a clutch-releasing pedal, a member actuated in one direction by said pedal subsequent to the release of the clutch to store power for automatically returning said member, a plurality of coupling devices for respectively actuating said shifting means to different positions of adjustment during the return of said member by the released power, and a trip actuated near the completion of the movement of said pedal for releasing said member and stored power.

14. The combination with a change speed transmission gear and a clutch, of a clutch-operating pedal, an automatic shifting mechanism, and means operated by a movement of the pedal in one direction for first storing power and then releasing the same to actuate said automatic shifting mechanism.

In witness whereof, I hereunto subscribe my name, as attested by the two subscribing witnesses.

RICHARD P. PALMER.

Witnesses:
  EMMA SPENER,
  L. A. BECK.